United States Patent [19]

Everson, Jr. et al.

[11] Patent Number: 5,512,890
[45] Date of Patent: Apr. 30, 1996

[54] SENSOR CONNECTION SYSTEM

[75] Inventors: Harold W. Everson, Jr., Painesville; Jon Slaybaugh, Mentor; Charles C. Juda, Hudson, all of Ohio

[73] Assignee: Namco Controls Corporation, Mentor, Ohio

[21] Appl. No.: 212,589

[22] Filed: Mar. 11, 1994

Related U.S. Application Data

[63] Continuation-in-part of Ser. No. 837,738, Feb. 19, 1992, abandoned.

[51] Int. Cl.⁶ .................................................. G08C 15/06
[52] U.S. Cl. ........................ 340/870.13; 340/870.16; 340/870.38; 340/825.16; 340/825.17; 340/511; 340/517; 340/518
[58] Field of Search ............................ 340/870.19, 506, 340/512, 521, 524, 870.11, 870.13, 870.16, 870.3, 870.38, 825.06–825.03, 825.10, 825.16, 825.17, 825.54, 825.77, 505, 510, 511, 513, 517, 518; 307/116, 125, 130; 324/537–539, 542, 556, 609, 713

[56] References Cited

U.S. PATENT DOCUMENTS

| 3,876,997 | 4/1975 | Farley et al. | 340/870.13 |
| 3,925,763 | 12/1975 | Wadhwani et al. | 340/524 |
| 3,982,180 | 9/1976 | Vaiden | 324/51 |
| 4,387,368 | 6/1983 | Day, III et al. | 340/870.11 |
| 4,566,336 | 1/1986 | German et al. | 340/870.13 |
| 4,604,620 | 5/1986 | Oho et al. | 340/825.07 |
| 4,833,451 | 5/1989 | Lehmann et al. | 340/513 |
| 5,216,434 | 6/1993 | Fukumura | 324/538 |

FOREIGN PATENT DOCUMENTS

| 0068482 | 5/1983 | European Pat. Off. . |
| 2115577 | 7/1983 | United Kingdom . |
| 8909147 | 5/1989 | WIPO . |

Primary Examiner—Michael Horabik
Attorney, Agent, or Firm—Rankin, Hill, Lewis & Clark

[57] ABSTRACT

A sensor connection apparatus for connecting a plurality of sensors to a process controller having a bus for transferring information, wherein each sensor produces an output corresponding to a sensed condition, includes a respective sensor cable that can be connected at one end to each sensor; a concentrator having each of the sensor cables connected thereto; the concentrator being connected to the bus; the concentrator comprising a circuit for producing for each sensor and associated sensor cable connected thereto a first signal in response to the sensor output and a second signal that corresponds to a sensor cable condition; the circuit further operating to couple the first and second signals for each sensor connected to the concentrator onto the bus for access by the process controller. In one embodiment, the concentrator transmits data to the process controller using a standardized communications protocol, such as CAN, using a microcontroller and transceiver.

13 Claims, 8 Drawing Sheets

SENSOR CONNECTION SYSTEM

This is a continuation in part of U.S. patent application Ser. No. 07/837,738 for "SENSOR CONNECTION SYSTEM" filed on Feb. 19, 1992, abandoned and owned by the assignee of the present invention.

BACKGROUND OF THE INVENTION

The present invention relates to apparatus for connecting sensors to a control or monitoring system, in particular, apparatus having fault-detecting capabilities.

As computer process control and monitoring plays a larger role in the industrial environment, the capability to connect large quantities of sensors efficiently and reliably to a central location has become increasingly important.

In the past, the process control or monitor for a machine or process had fewer input devices and sensors. In this situation, it was acceptable to wire individually each sensor to the control.

As control and monitoring has become more complicated due to automation needs, sensor inputs have multiplied and the number of wires required has grown very large.

Rather than run individual electrical circuits between each sensor and the control, methods have been used that distribute groups of I/O modules into remote electrical boxes such that each I/O group places sensor outputs onto shared electrical circuits or buses that multiplex the signals back to the control.

It is relatively easy and economical to protect the bus from physical damage because it contains a relatively small number of conductors or other data transmission medium, and it need only directly communicate with each I/O group which are typically located farther from physical hazards.

On the other hand, each sensor must still be located near the condition to be sensed. Unfortunately, it is often too expensive and/or difficult to protect fully the connection between the sensor and I/O group from physical hazards.

In practice, the connection between the sensors and the remote I/O group electrical box is often the portion of the control/monitoring system most likely to fail. Typically, this connection is in the form of flexible cables with a quick connector on one end, the other end being hard-wired. While tough and sturdy, these cables are often damaged in the harsh industrial environment.

As process control/monitoring becomes more complicated, it becomes increasingly critical to determine whether a condition received from a remote device is the actual state of the sensor or due to a fault in the sensor or its cable. Not only is it desirable to determine if a cable fault exists, it is also important to be able to identify quickly which cable is faulty.

To minimize costs and complexity, the invention contemplates that several sensors can be connected to a conveniently located concentrator, which does the necessary transformation to place the sensors information onto the bus. To increase flexibility, the concentrator uses, in one embodiment, standardized communications protocols.

SUMMARY OF THE INVENTION

The sensor connection apparatus or system of the invention provides for the efficient and effective connection of sensors to a central location and the detection of faults occurring in the sensors and the sensor cables.

The sensor connection system is intended for use with a plurality of sensor units. Each unit provides a first impedance in response to a first sensed condition and a second impedance in response to a second sensed condition. Neither of the impedances provided by the sensor units is electrically a short circuit or open circuit.

Each sensor unit is connected to a concentrator by a sensor cable having quick connectors on each end. The concentrator provides a first logical signal in response to the first impedance, a second logical signal in response to the second impedance and a third logical signal in response to an error impedance. The error impedance is indicative of a short circuit or an open circuit in a respective sensor cable. A plurality of concentrators can be used depending on the total number of sensor units to be accessed.

A bus is connected to the concentrator for transmitting the logical signals to a main process controller connected to the bus. In one embodiment of the invention, the concentrator is accessed by a first controller that is separate from the main process controller. The first controller causes the concentrator to provide the signals for each sensor unit connected thereto. The first controller provides a status for each sensor unit and sensor cable to the main process monitoring or control system.

In another embodiment of the invention, the concentrator includes a circuit for transmitting and receiving information directly with the main process controller over the bus using a standardized communications protocol. In this embodiment, the concentrator includes a controller therein, so that the concentrator can be directly connected to the main process controller via the bus.

The concentrators can be advantageously located in close proximity to the sensors connected thereto, and also encapsulated for protection from environmental hazards.

Status lights are provided on the concentrators. This allows rapid visual identification of system faults. A quick visual inspection shows operators and maintenance personnel where the problem is located. This allows maintenance crews to minimize down-time.

It is possible to provide the same signal information from the concentrators to the monitoring or control system by parallel or serial data transmission. The latter arrangement is particularly used in the second embodiment of the invention.

An adapter apparatus allows for the connection of contact closure type switch sensors to the connection system of the invention.

These and other aspects and advantages of the present invention will be readily understood and appreciated by those skilled in the art from the following detailed description of the invention with the best mode contemplated for practicing the invention in view of the accompanying drawings.

DESCRIPTION OF THE PREFERRED EMBODIMENTS

Figure 1:
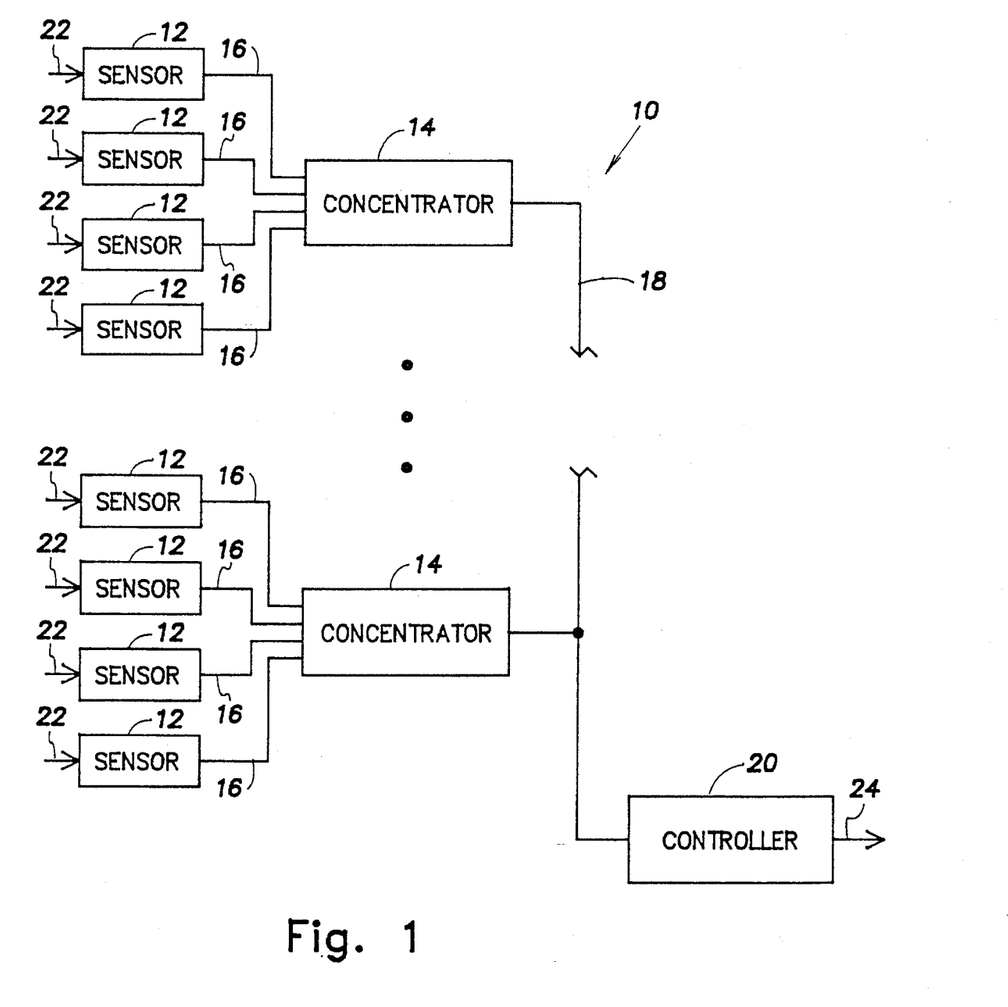
FIG. 1 is a block diagram of a sensor connection system according to the invention.

Referring to FIG. 1, a first embodiment of a sensor connection system 10 is formed from groups of sensors 12 connected to concentrators 14 by sensor cables or cord sets 16. The concentrators 14 are connected to a bus 18 leading to a controller 20.

Conditions-to-be-sensed 22 act on each sensor 12 which then provides either an "on" or "off" indication. These individual indications are time-division multiplexed by the concentrators 14 onto the bus 18 under the control of the controller 20. As will be more fully set forth below, the concentrators 14 also time-division multiplex the "fault" or "no fault" condition of each of the cord sets 16 onto the bus 18.

Figure 4:
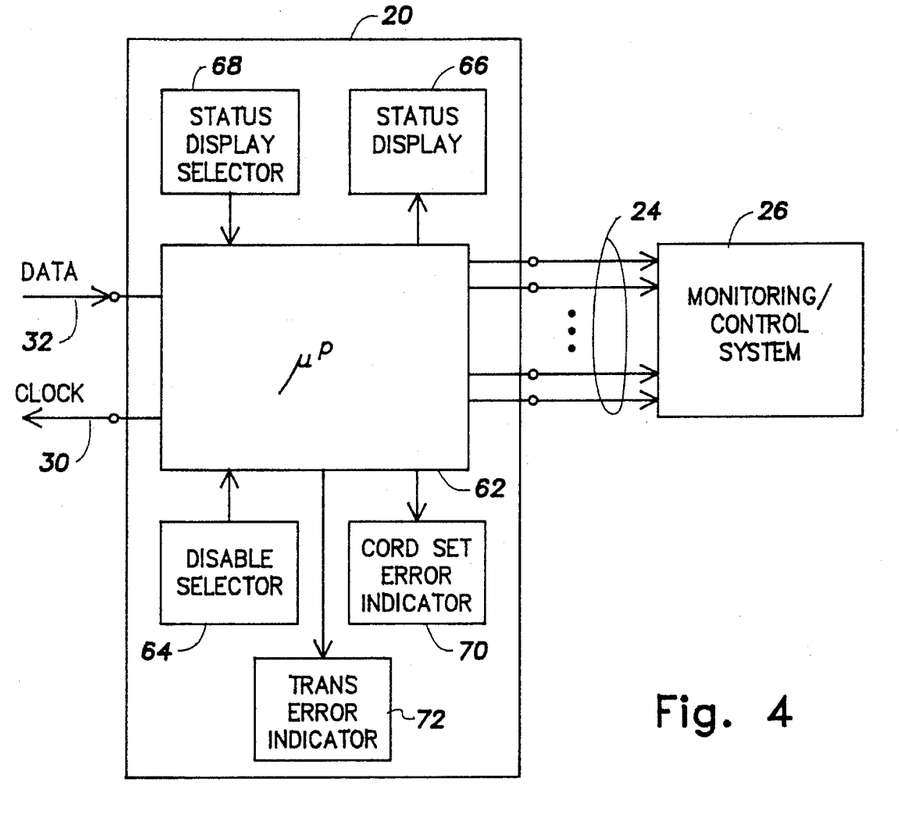
FIG. 4 is a block diagram of a controller according to the invention.

The controller 20 provides the state of the sensors 12 and cord sets 16 by a link 24 to a monitoring/control system 26 (FIG. 4).

In this first embodiment, four sensors 12 are connected to each concentrator 14 and eight concentrators 14 are connected to the bus 18.

Figure 2:
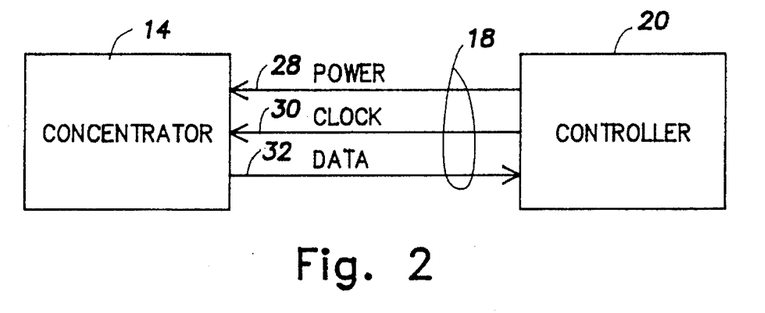
FIG. 2 is a block diagram of a connection system according to the invention showing the signals on the bus.

Referring to FIG. 2, the bus 18 is composed of conductors for power 28, clock 30 and data 32. The concentrators 14 are connected in parallel to the bus 18.The controller 20 provides power to operate the concentrators 14 and sensors 12 via the power conductors 28. The sensor connection system 10 is controlled by signals from the controller 20 on the clock conductors 28, which provide control and timing to each concentrator 14. The state of the sensors 12 and cord sets 16 is transmitted by the concentrators 14 to the controller 20 on the data conductors 32. Typically, the conductors 30, 32 will have characteristic impedance matching termination on each end.

The power conductors may carry, for example, 30 volts d.c. The clock 30 and data 32 conductors may carry, for example, signals conforming to the RS485 standard. This standard uses a pair of conductors to carry a differentially encoded digital signal.

Figure 3:
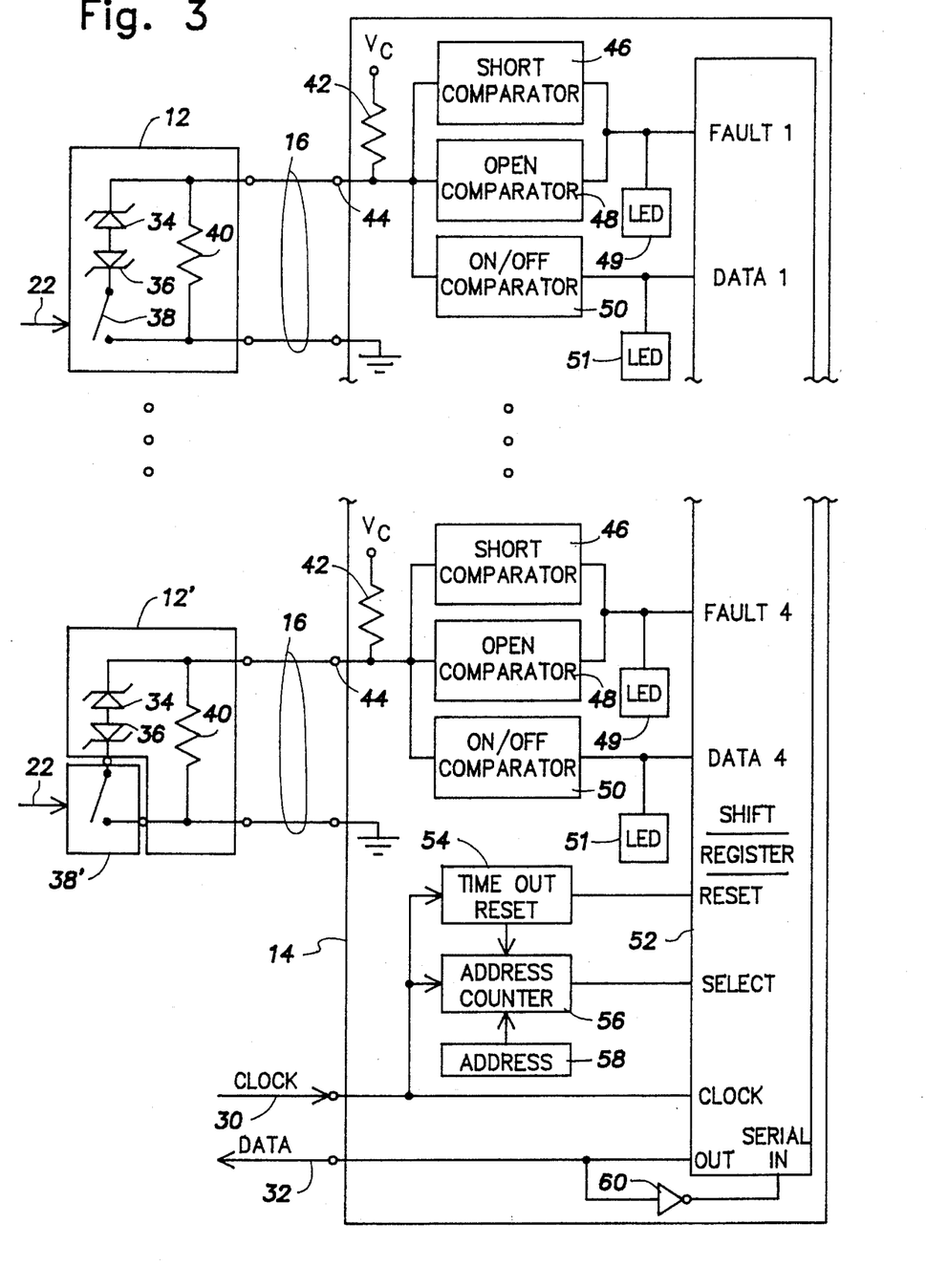
FIG. 3 is a combination schematic and block diagram of sensors and a concentrator according to the invention.

Referring to FIG. 3, an exemplary sensor 12 is composed of back-to-back zener diodes 34, 36 in series with a switch 38, all connected in parallel with a resistor 40. Other embodiments of the sensor 12 may be employed, as long as they exhibit the characteristics described below.

The condition-to-be-sensed 22 determines whether the switch 38 is "on" or "off."

The sensor 12 is connected to the concentrator 14 by a cord set 16. In the embodiments described herein, the cord sets 16 are commercially available pre-assembled cord sets having connectors at each end that mate with respective connectors on the concentrator 14 and sensors 12.

The concentrator 14 supplies a voltage $V_c$ through a resistor 42 to the sensor 12. The voltage $V_c$ may be, for example, 20 volts d.c. If the switch 38 is off, the voltage $V_c$ is divided between the resistors 40, 42 which may be of such a ratio that, for example, the terminal 44 would be at 15 volts.

If the switch 38 is on, the voltage at the terminal 44 would be essentially determined by the zener voltage of the zener diodes 34, 36, for example, 10 volts. The diodes 34, 36 are connected in back-to-back configuration so that operation of the sensor 12 is not dependent on the polarity of the voltage applied to it.

The foregoing assumes that the cord set 16 is undamaged and functional. If the cord set 16 is open because, for example, it is not connected or has been broken, the voltage at the terminal 44 is at or near $V_c$. If on the other hand, the cord set 16 is shorted by, for example, crushing or other damage, the voltage at the terminal 44 is at or near 0 volts.

Thus, the voltage at the terminal 44 is indicative of the state of the sensor 12 (the switch 38 on or off) or the state of the cord set 16 (opened or shorted). In order for state of the sensor 12 to be differentiated from that of the cord set 16, it must exhibit an impedance for its "on" state and for its "off" state that are not only different from each other, but also different from a shorted or open cord set.

The sensor 12 can be implemented in other ways, the important consideration being that it reliably provide an "off" impedance and an "on" impedance that are readily distinguishable from each other and from the impedances of a faulty cord set 16.

Existing switch-type sensors 38' can be employed with the sensor connection system 10 by eliminating the internal switch 38 of the sensor 12 and, instead, externally connecting the switch-type sensor 38" to a switch adapter 12" comprising the remaining portion of the sensor 12. This allows the retrofitting of the connection system 10 to many existing sensors.

The logical state of the sensor 12 and cord set 16 are determined by a "short" comparator 46, an "open" comparator 48 and an "on/off" comparator 50.

If the voltage at the terminal 44 is below a threshold $V_s$ (e.g., 8 volts), the short comparator 46 indicates a short in the cord set 16. If the voltage at the terminal 44 is above a threshold $V_o$ (e.g., 17 volts), the open comparator 48 indicates an open in the cord set 16. If either a short or open is indicated, a logical error or fault signal is applied to a respective input to a shift register 52 (e.g., FAULT 1) by means of a "wired OR" and also to a fault indicator 49.

If the voltage at the terminal 44 is above a threshold $V_D$, the on/off comparator 50 indicates that the sensor 12 has sensed a first condition that has resulted in the switch 38 being off. If the voltage at the terminal 44 is below the threshold $V_D$, the on/off comparator 50 indicates that the sensor 12 has sensed a second condition that has resulted in the switch 38 being on. These conditions may be, for example, movement of a cam or lever, a pressure limit transducer, a proximity detector, etc. The on/off comparator 50 provides a logical signal representing the state of the sensor 12 to a respective input of the shift register 52 (e.g., DATA 1) and also to an indicator 51.

The indicators 49, 51 may be, for example, LEDs or other light sources.

It should be noted that the comparator 50 will provide an indication of the switch 38 being open or closed even if the cord set 16 is open or shorted, respectively. However, if a fault signal is present, appropriate action can be taken to disregard the status of the sensor 12.

If for some reason only shorts or only opens in the cord set 16 are of interest, the open comparator 48 or the short comparator 36, respectively, can be eliminated.

Clock pulses from the controller 20 are provided on the clock conductors 30 (which are changed from RS485 signals to TTL signals by an unshown receiver). In the absence of a clock pulse for at least two pulse periods, the time out reset 54 resets the shift register 52 and the address counter 56.

The address counter 56 counts clock pulses after a reset. The counter 56 compares its count to a concentrator address 58. The counter 56 may be, for example, a 6-bit counter. The fourth, fifth and sixth most significant bits can then be used to address up to eight different concentrators 14.

Once the count in the most significant bits of the counter 56 match the address 58, the shift register 52 reads the status of the sensors 12 and cord sets 16 and serially outputs that status on the data conductors 32 (the TTL signals are changed to RS485 signals by an unshown transmitter). At the same time the status is inverted by the inverter 60 and serially fed back into the shift register 52.

For example, if the address 58 of the concentrator 14 is "000," then for each of the first eight clock pulses (counter 56 counts "000000" to "000111"), a data/fault bit is serially output from the shift register to the bus 18. Similarly, for a concentrator 14 with an address 58 of "010," eight data/fault bits would be output as the counter 56 counted pulses from "010000" to "010111."

For this example, the counter 56 wraps around after 64 clock pulses. Because the contents of the shift register 52 are inverted and fed back into the shift register 52, the whole process repeats for pulses 65 through 128, except that the logical status from each concentrator 14 is inverted.

Figure 5:
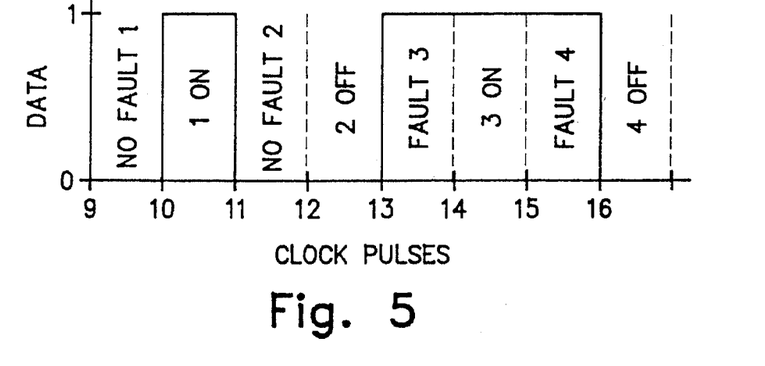
FIG. 5 is a graph showing an exemplary logical data signal for one concentrator.

Referring to FIG. 5, an exemplary graph of the logic data signal for the status of a concentrator 14 having an address 58 of "001" is shown. The graph indicates that a first sensor 12 is on and has no respective cord set 16 error and that The respective cord sets 16 of a third sensor 12 and a fourth sensor 12 are damaged (the status indicated for the sensors themselves thus being unreliable).

Figure 6:
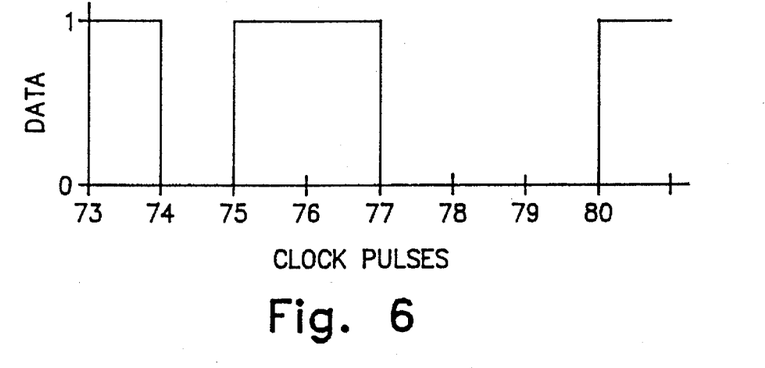
FIG. 6 is a graph showing an inverted logical data signal for the concentrator of FIG. 5.

Referring to FIG. 6, the concentrator 14 producing FIG. 5 produces a logically inverted version of the signal of FIG. 5 in response to the second 64 clock pulses (for this concentrator, pulses 73 through 80).

In the manner described above, the status from individual concentrators 14 are time-division multiplexed onto the bus 18. For the first 64 clock pulses, the actual logical status is transmitted on the bus 18 and for the next 64 clock pulses the inverted logical status is transmitted. After 128 clock pulses, the process is repeated by the controller 20 delaying at least two clock pulse periods before again sending a stream of 128 pulses.

Referring to FIG. 4, a controller 20 includes a microprocessor 62 having on-chip RAM and program ROM. The microprocessor 62 supplies the clock pulses to the clock conductors 30 (the TTL signals are changed to RS485 signals by an unshown transmitter). The status data from the concentrators 14 are received by the microprocessor 62 from the data conductors 32 (the RS485 signals are changed to TTL signals by an unshown receiver).

A disable selector 64 is connected to the microprocessor 62 to instruct the microprocessor 62 to ignore the status of selected sensors 12. This allows the sensor connection system 10 to allow for sensors/concentrators that are not actually installed or to ignore chosen sensors. The selector 64 may be, for example, a series of individual switches.

A status display 66 displays the status of the sensor connection system 10 on, for example, LEDs. The particular status (e.g., sensor on/off status, cord set status, interconnect fault status, diagnostics, etc.) is selected by a status display selector 68 connected to the microprocessor 62.

In addition, whenever a cord set 16 error is detected, the microprocessor 62 provides an error indication on a cord set error indicator 70 (e.g., an LED).

The microprocessor 62 compares the status transmitted by the concentrators 14 in response to the first 64 pulses with that transmitted in response to the next 64 pulses (inverted status). If the status for each sensor 12 and cord set 16 for the first 64 bits and the second 64 bits do not exactly correspond to one another except for inversion, the microprocessor 62 indicates that a transmission error has occurred on a transmission error indicator 72 (e.g., an LED).

The microprocessor 62 also provides the status information to the monitoring/control system 26 by the link 24. Typically, the link 24 will be isolated and individually buffered parallel outputs corresponding to each of the sensors 12. Thus, to the monitoring/control system 26, it will be as if it is directly connected to each sensor. This allows the connection system 10 to be installed without the time, trouble or expense of changing the programming of an existing monitoring/control system 26.

For added capability, the controller 20 can provide the monitoring/control system 26 with cord set and transmission error status. This can be used for alerting the machine operators and maintenance crews, who can also get the information from the status display 66. This greatly speeds correction of the problem, as once identified, a cord set 16 can be rapidly changed.

Another valuable advantage is that supplying the error status to the monitoring/control system 26 allows it to choose to ignore non-critical sensors or to shut down the system is critical sensors are lost.

Figure 7:
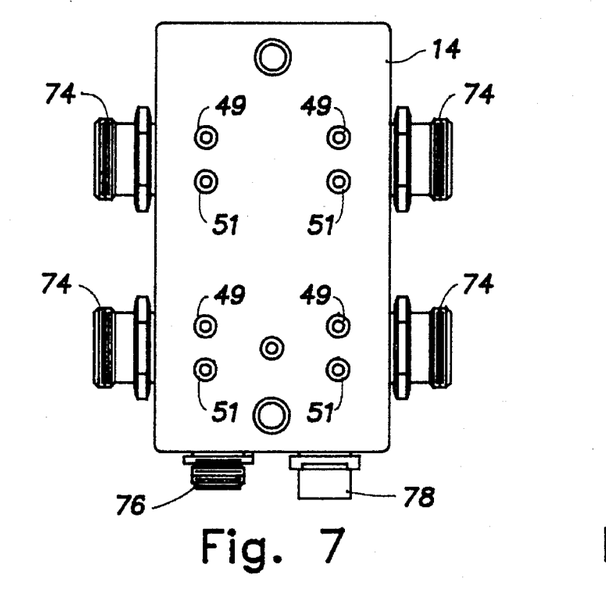
FIG. 7 is a top plan view of a concentrator according to the invention.
Figure 8:
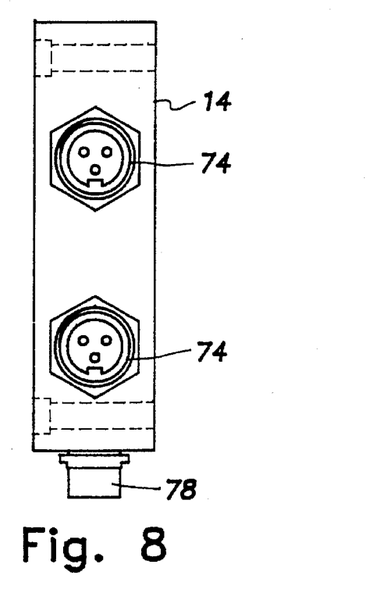
FIG. 8 is a right side elevation view of the concentrator of FIG. 7.

Referring to FIGS. 7 and 8, a concentrator 12 is encapsulated to protect it from environmental hazards. Such materials as epoxy, rtv or polyurethane may be used as encapsulants.

Electrical connectors 74 mate with connectors on the ends of the cord sets 16. The bus 18 passes through the concentrator 14 via the connectors 76, 78, which mate with connectors on each segment of the bus 18.

Figure 9:
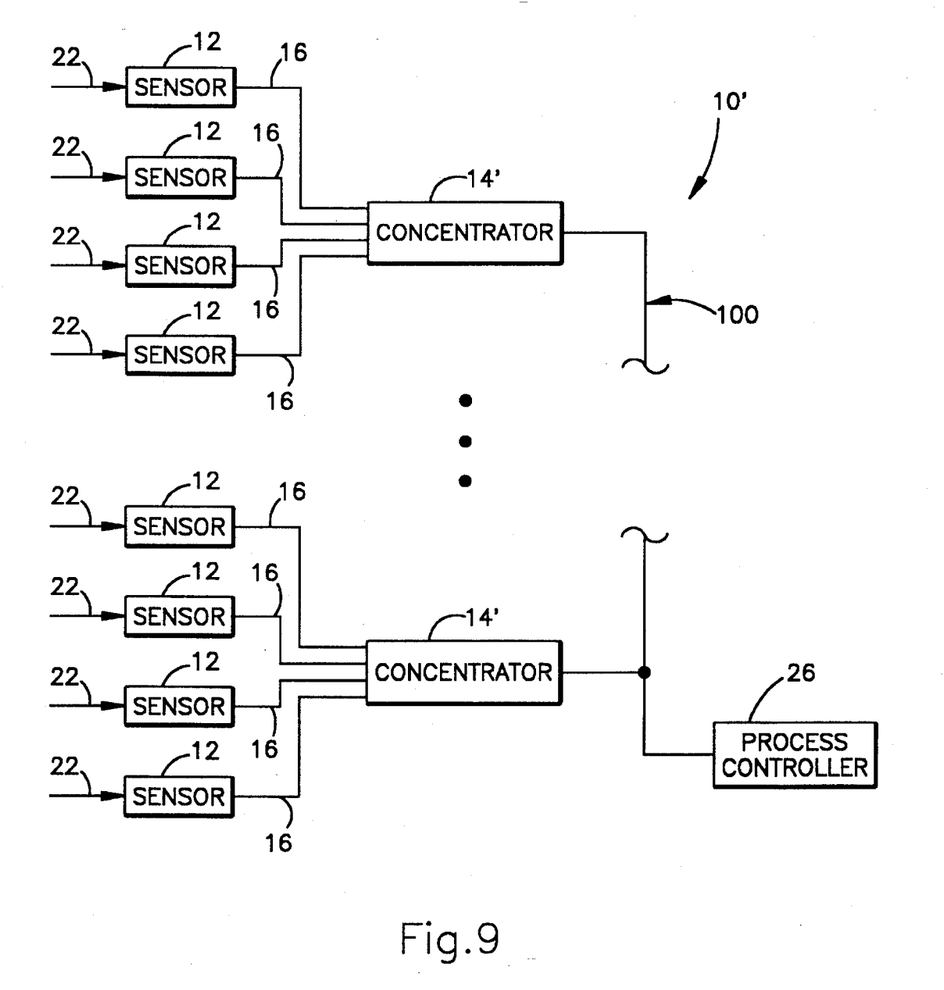
FIG. 9 is a block diagram of another embodiment of the invention.
Figure 10:
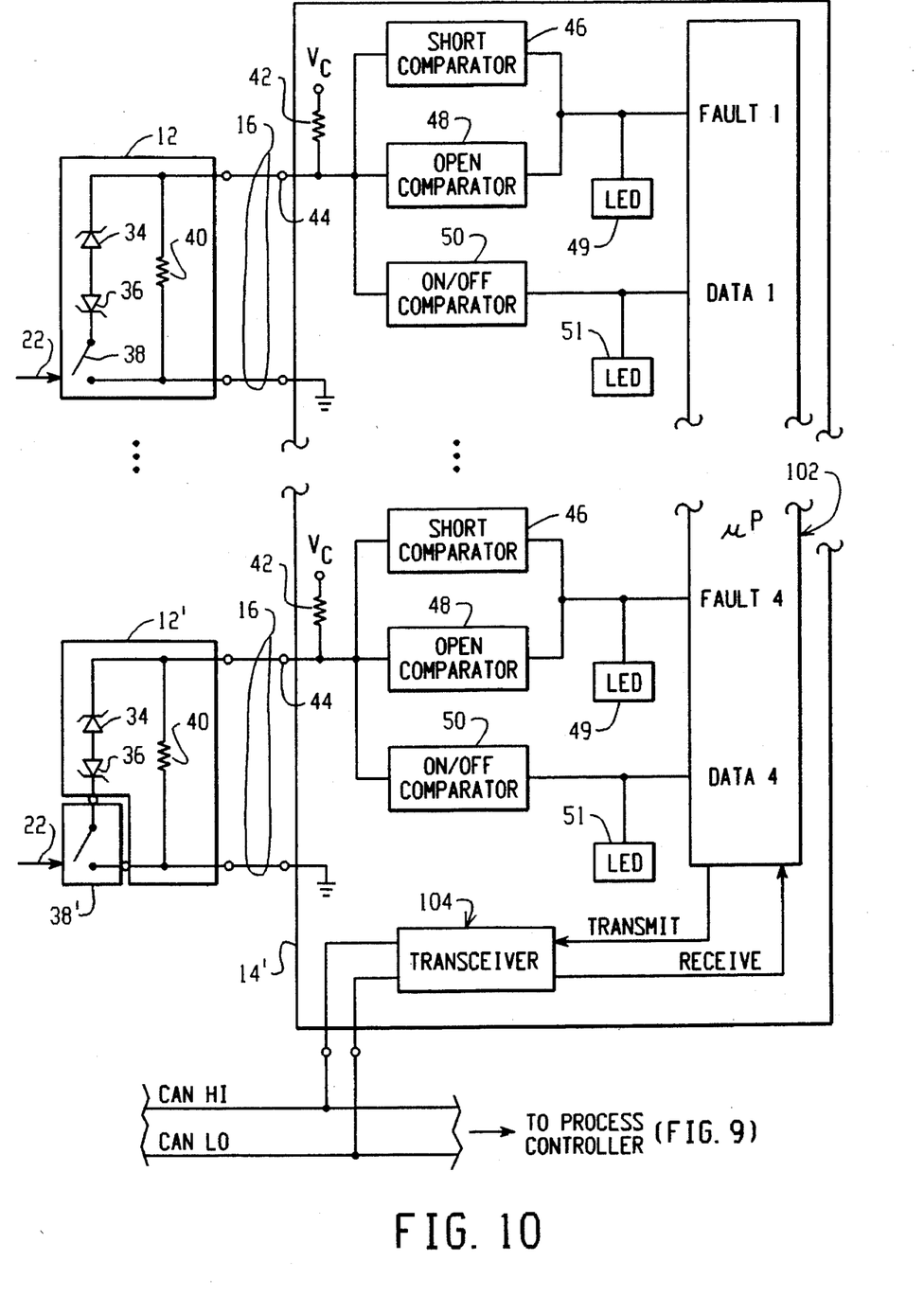
FIG. 10 is a more detailed block diagram of the embodiment of FIG. 9.

With reference next to FIGS. 9 and 10, we show another embodiment of the invention. This embodiment is similar in many respects to the embodiment of FIGS. 1–8, and to the extent that like elements are used, they have been given the same reference numeral. An important difference in this embodiment, however, is the interface arrangement between the concentrator(s) and the main process monitoring or control system (hereinafter referred to as the process controller).

More specifically, in the first embodiment, the concentrator output signals were transferred to the process controller 26 via the controller 20 by use of a parallel data bus 24. However, the communications link between the concentrators and the controller 20 is determined by the particular programmed operation of the controller 20. In many applications, however, it will be desirable to transfer information directly between the concentrators and the process controller 26 using standardized communications systems and protocols. The embodiment of FIGS. 9 and 10 is directed to such an arrangement for a sensor connection apparatus 10' in accordance with the invention.

As shown, a plurality of sensors 12 are connected to respective concentrators 14' by a corresponding plurality of sensor cables 16. The concentrators in FIGS. 9 and 10 are noted with a "prime" (') because the circuit design is modified from the embodiment of FIGS. 1–8.

Each concentrator 14' is connected to a bus 100, which in this embodiment can be a simple two-wire bus. The bus is also connected to the main process controller 26. Power for the concentrators and sensors can be provided by additional conductors with the bus 100, if so desired, or a separate power line and plug arrangement for the concentrator (not shown).

As illustrated in FIG. 10, the concentrator 14' can utilize the same comparator detection circuits for producing logical signals that correspond to the sensor outputs and the sensor cable conditions as in the previous embodiment. Thus, the concentrator 14' also includes the status lights 49,51 that respectively indicate the sensor cable and sensor output conditions. As with the first embodiment, the sensor status 8 light 51 indicates the open/short cable condition when a cable fault is present, and indicates the sensor status when a cable fault is not present. The sensors can integrally contain the zener diodes 34,36 and resistance 40, or alternatively can be connected to an adapter 12'.

The concentrator 14' arrangement includes a microcontroller 102 that receives input signals from the various comparator circuits used to detect the sensor and sensor cable conditions. Alternatively, the comparator circuits could be integral with the microcontroller 102 if desired.

The concentrator 14' further includes a transceiver device 104 that is used to transmit and receive information with the process controller 26 via the bus 100.

In accordance with this embodiment of the invention, the concentrator 14' and process controller 26 exchange information, instructions and data via a standardized communications protocol generally known to those skilled in the art as Controlled Area Network or CAN. This particular system utilizes serial data transfer along two conductors, designated by convention as CAN Hi and CAN Lo. Signal transfer is by differential transmit and receive pulses on the bus. For many applications, a simple twisted pair can be used for the bus 100.

The transceiver 104 operates as a serial interface for the transmit and receive operations between the microcontroller 102 and the process controller 26.

The microcontroller 102 can be, for example, device part no. MC68HC05X4 available from Motorola, Inc. The transceiver device 104 can be part no. PCA82C250T available from Phillips. These devices can be programmed and connected in accordance with the manufacturers' specifications to carry out the desired communication between the concentrators and the process controller. The process controller, of course, will use the same protocol. A suitable protocol can be, for example, CAN Specification 2.0 available from Robert Bosch GmbH.

Each concentrator 14' transmits data concerning the sensor outputs and sensor cable conditions in response to interrogation signals received from the process controller and in accordance with the particular protocol in use. Those skilled in the art will appreciate that the invention can be used with other standard communications protocols as desired for a particular application. For example, Seriplex or Echelon based systems could be used, although the concentrator design will be modified in accordance with the selected configuration. Such standardized protocols typically include integrated transmission error checking to verify the integrity of the transmit and receive functions.

Figure 11A:
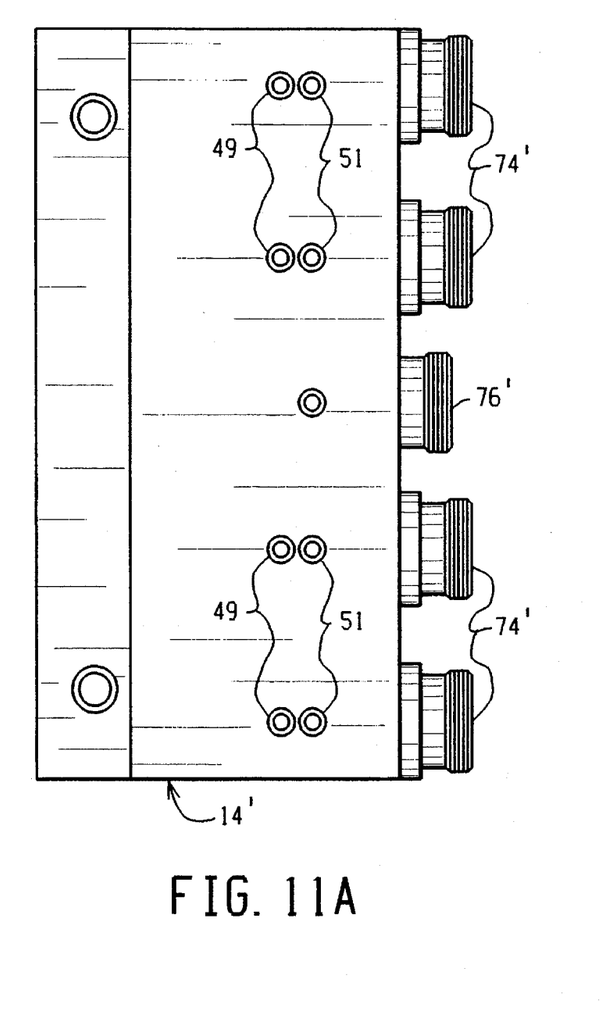
FIGS. 11A,11B and 12A,12B illustrate top plan and elevation views respectively of alternative embodiments of the concentrator.
Figure 11B:
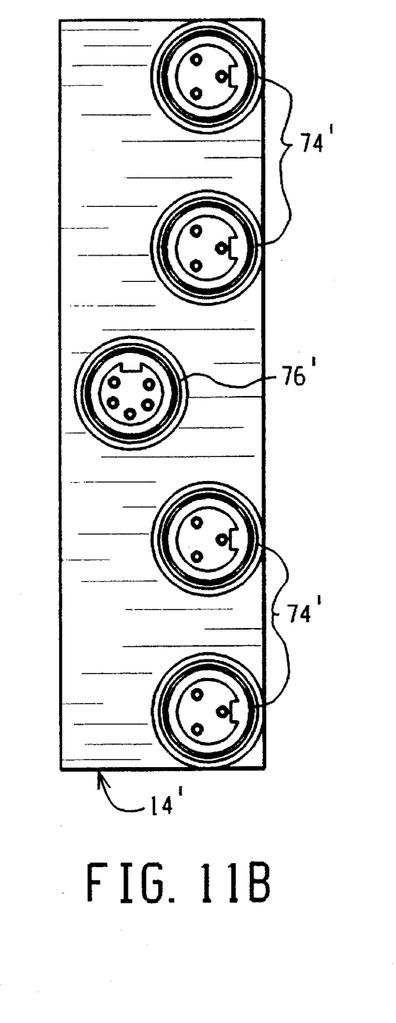

With reference to FIGS. 11A,11B and 12A,12B we illustrate alternative embodiments of the concentrator 14'. In the embodiment of FIGS. 11A,11B, the electrical connectors 74 for the sensor cables are arranged in a row on one side of the concentrator, with a connector 76' centrally provided for a connector associated with the bus 100. In these alternative embodiments, the concentrator only uses one connector for the bus with a T-connection provided at the bus. This is distinguished from the embodiment of FIGS. 1–8 previously described herein in which the T-connection was provided inside the concentrator. As shown in FIG. 11A, the indicator lights 49',51' are disposed on top of the concentrator for easy visual access. Each related pair of lights are disposed in alignment with its repective sensor cable connector to permit quick identification of the faulty cable or sensor.

Figure 12A:
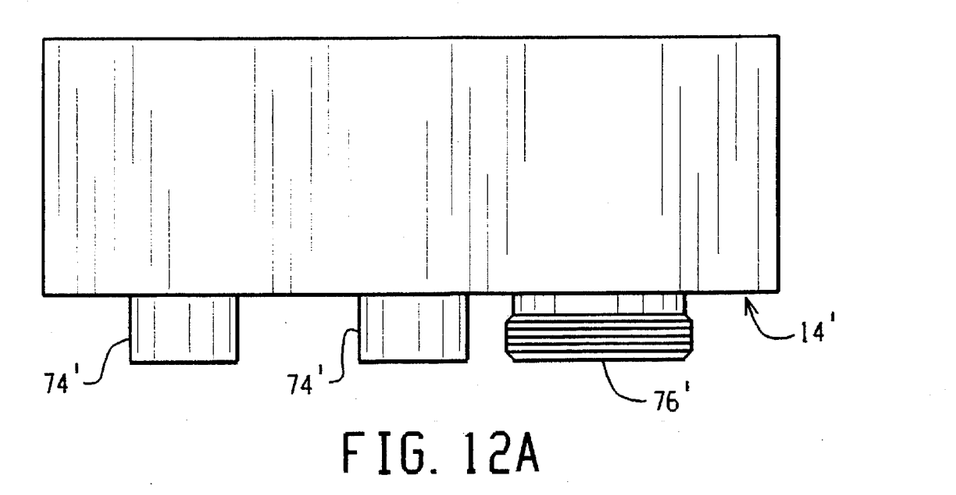
Figure 12B:
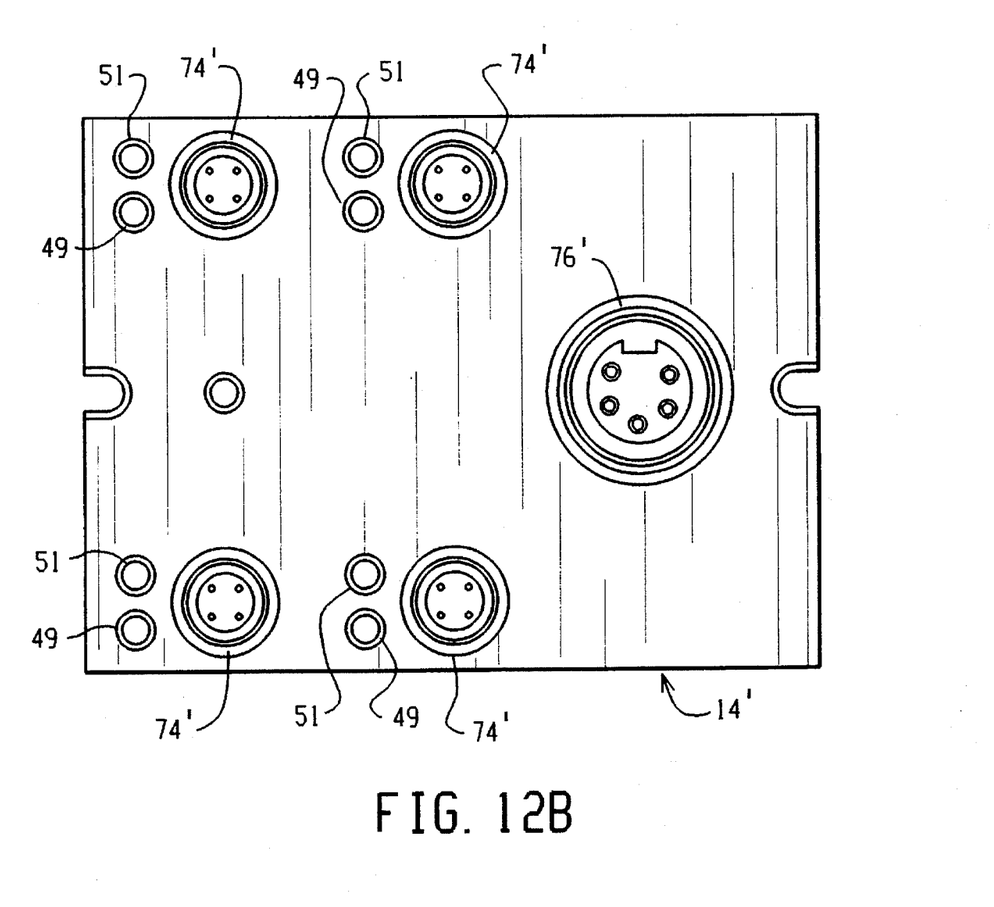

In the embodiment of FIGS. 12A,12B, the connectors 74' and 76' are disposed on the same side of the concentrator 14' with the indicator lights 49',51'. The light pairs are positioned near their respective cable connector.

Use of the concentrator concept in accordance with the invention in combination with an industry standard communications protocol achieves significant advances in the use of multiple sensors in complex process control systems. The concentrators greatly simplify cabling requirements while at the same time facilitating troubleshooting and failure detection by providing both sensor data and sensor cable data to the process controller. By transmitting both sensor output data and sensor cable conditions, full fault detection is provided because communication errors are independently checked.

Additional flexibility is realized by the inclusion of the light sources that permit simple visual fault identification close to the sensors and hence the point of failure. Fully encapsulated concentrators permit the concentrators to be located in otherwise hostile environments near the sensors. Sensor cable connections are further simplified with the use of standard cables having quick connectors on both ends, thus avoiding the need for hardwired connections at the concentrators. A simple and reliable communications cable, such as a twisted pair, can be used for the longer interconnection distances between the concentrators and the process controller. This permits the sensor cables to be shorter and hence more reliable.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A sensor connection apparatus for connecting a plurality of contact sensors to a process controller having a bus for transferring information, wherein each sensor produces an open and closed switch output corresponding to a sensed condition, comprising:

a respective sensor cable for connection at one end thereof to each sensor;

a concentrator having means for connecting each of said sensor cables thereto; and means for connecting said concentrator to the bus;

said concentrator comprising circuit means producing for each sensor and associated sensor cable connected thereto a first signal in response to the sensor output and a second signal that represents a sensor cable open circuit and short circuit conditions;

said circuit means further operating to couple said first and second signals for each sensor connected to said concentrator onto the bus when accessed by the process controller.

2. The apparatus of claim 1 wherein said concentrator is disposed proximate the sensors connected thereto and remote from the process controller during use to reduce sensor cable lengths and cable complexity between the process controller and the sensors.

3. The apparatus of claim 1 wherein the sensors are used in hostile environments, and further wherein said concentrator is encapsulated for protection from such hostile environments.

4. The apparatus of claim 3 wherein said concentrator further comprises a plurality of light sources for respective visual indication of the sensor output and sensor cable conditions for all the sensors connected thereto.

5. The apparatus of claim 1 comprising a plurality of said concentrators connected to said bus for the process controller, and further wherein each sensor cable has quick connectors on each end thereof.

6. The apparatus of claim 1 wherein said circuit means comprises microcomputer means for serially transmitting and receiving said sensor and sensor cable signal information with the process controller through said connecting means and the bus.

7. The apparatus of claim 6 wherein said circuit means further comprises a transceiver interface between said microcomputer means and the bus.

8. The apparatus of claim 7 wherein said microcomputer means and transceiver interface operate in accordance with a communications protocol.

9. The apparatus of claim 8 wherein said microcomputer means and transceiver operate with a controller area network (CAN) serial communications protocol.

10. The apparatus of claim 1 further comprising an adapter device for connecting one of said sensors to the apparatus, said sensor providing an open circuit or short circuit condition across two sensor output terminals, said adapter device comprising:

four terminals comprising two input terminals connectable to the sensor output terminals, and two output terminals connected to the apparatus with a cable;

a first impedance in series with the sensor when connected to the adapter apparatus; and a second impedance in parallel with said first impedance and sensor when connected to the adapter apparatus, said adapter apparatus providing at its output terminals said first impedance in response to a short circuit condition of the sensor, said second impedance in response to an open circuit condition of the sensor, wherein said first and second impedances are different from a short circuit or an open circuit impedance condition in the cable.

11. The apparatus of claim 1 wherein each sensor produces an open and short circuit output condition depending on a sensed condition.

12. The apparatus of claim 11 wherein said circuit means detects said sensor open and short circuit output conditions and distinguishes them from said open and short circuit conditions of the respective sensor cable.

13. The apparatus of claim 12 wherein said circuit means comprises an impedance having discrete values that are a function of said sensor open and short circuit conditions and said sensor cable open and short circuit conditions.

* * * * *